United States Patent
Imai et al.

(10) Patent No.: US 11,884,860 B2
(45) Date of Patent: Jan. 30, 2024

(54) FLUIDIZED SAND AND METHOD OF DENSITY CONTROL

(71) Applicant: Fudo Construction Inc., San Mateo, CA (US)

(72) Inventors: Yuki Imai, San Mateo, CA (US); Hidenori Takada, Tokyo (JP)

(73) Assignee: Fudo Construction Inc., San Mateo, CA (US)

(*) Notice: Subject to any disclaimer, the term of this patent is extended or adjusted under 35 U.S.C. 154(b) by 612 days.

(21) Appl. No.: 17/123,431

(22) Filed: Dec. 16, 2020

(65) Prior Publication Data

US 2021/0189237 A1  Jun. 24, 2021

Related U.S. Application Data

(60) Provisional application No. 62/951,015, filed on Dec. 20, 2019.

(51) Int. Cl.
| | |
|---|---|
| *C09K 17/40* | (2006.01) |
| *C08L 33/08* | (2006.01) |
| *C08L 33/26* | (2006.01) |
| *C08L 23/08* | (2006.01) |
| *C08K 5/17* | (2006.01) |
| *C08L 71/02* | (2006.01) |
| *C08K 11/00* | (2006.01) |
| *C08K 5/1515* | (2006.01) |

(52) U.S. Cl.
CPC ............ *C09K 17/40* (2013.01); *C08K 5/1515* (2013.01); *C08K 5/17* (2013.01); *C08K 11/00* (2013.01); *C08L 23/08* (2013.01); *C08L 33/08* (2013.01); *C08L 33/26* (2013.01); *C08L 71/02* (2013.01); *C08K 2201/002* (2013.01); *C08L 2205/02* (2013.01); *C08L 2205/035* (2013.01)

(58) Field of Classification Search
CPC ......... C09K 17/40; C08L 33/08; C08L 33/26; C08L 23/08; C08K 5/17

USPC .......................................................... 523/132
See application file for complete search history.

(56) References Cited

U.S. PATENT DOCUMENTS

| | | | |
|---|---|---|---|
| 9,181,672 B2 | 11/2015 | Nozu et al. | |
| 2002/0123433 A1* | 9/2002 | Goodhue, Jr. | .......... C04B 28/26 |
| | | | 507/140 |

FOREIGN PATENT DOCUMENTS

| | | |
|---|---|---|
| JP | 4052970 | 11/2004 |
| JP | 4346078 | 9/2005 |
| JP | 4823968 | 11/2008 |
| JP | 5188894 | 1/2010 |
| JP | 5188901 | 2/2010 |
| JP | 5189951 | 5/2010 |
| JP | 5320248 | 6/2010 |
| JP | 5389615 | 6/2011 |
| JP | 5404344 | 6/2011 |
| JP | 5545622 | 6/2011 |
| JP | 5360908 | 10/2011 |
| JP | 5780714 | 12/2011 |
| JP | 5478386 | 1/2012 |
| JP | 5697248 | 12/2012 |
| JP | 6150328 | 9/2014 |
| JP | 6188081 | 10/2015 |
| JP | 6335020 | 12/2015 |

* cited by examiner

*Primary Examiner* — Deve V Hall
(74) *Attorney, Agent, or Firm* — McHale & Slavin, P.A.

(57) ABSTRACT

A fluidized sand composition for use as a filling material for sinkholes and the like weakened ground cavities. The fluidized sand composition is produced by mixing graded sand, water, a fluidizer, a plasticizer, and a surface active agent. The fluidized sand composition is easily injected into the ground cavity of a sinkhole. After filling, the fluidized sand composition will return to the solid natural condition according to the effect of plasticizer previously added. The fluidized sand composition allows for compaction, soil stabilization, permits water migration through the material, and can be easily excavated.

10 Claims, 1 Drawing Sheet

FLUIDIZED SAND AND METHOD OF DENSITY CONTROL

FEDERALLY SPONSORED RESEARCH OR DEVELOPMENT

Not Applicable.

CROSS REFERENCE TO RELATED APPLICATION

In accordance with 37 C.F.R. 1.76, a claim of priority is included in an Application Data Sheet filed concurrently herewith. Accordingly, the present invention claims priority to U.S. Provisional Patent Application No. 62/951,015 filed Dec. 20, 2019 disclosing "FLUIDIZED SAND AND METHOD OF DENSITY CONTROL" the contents of which is incorporated herein by reference.

FIELD OF INVENTION

The present invention relates to the field of construction and, more particularly, to a fluidized sand composition and method of density control.

BACKGROUND OF THE INVENTION

Soil compaction and densification is used where soil structure stability is necessary for proper load bearing capacity. This is especially critical in areas where limestone is prevalent leading to a high probability of cavities, commonly referred to as sinkholes. Florida, Texas, Alabama, Missouri, Kentucky, Tennessee, Pennsylvania are known to have large areas of limestone which results in sinkholes when the limestone weakens, typically due to water pockets that dry up. Limestone is notoriously deceptive in its foundation strength especially when water is present. Soil that includes limestone pinnacles/cavities require soil compaction and densification if the soil is to be used for load bearing purposes. Conventional soil compaction may be performed by a deep dynamic compaction (DDC) technique. The technique employs a multi-ton weight that is allowed to free fall striking a particular area. Vibration caused by the weigh falling can cause damage to surrounding structures. Mammoth vibro-tamper (MVT) is also a known technology to compact sandy ground by using equipment that consists of a strong vibrator and a larger tamping plate. Applicant's U.S. Pat. No. 9,181,672 discloses a method of compacting soil based upon a Standard Penetration Test of individual partitions using a series of tamping sessions using tamper plates of a different size and weight. The method includes overlapping tamping of a grid pattern of partitions; each tamping session is timed to coincide with pore water pressure causing soil moisture caused through a dilatancy effect to provide soil compaction.

If the area is not properly compacted, the soil may not be stabile enough to support a structure. A cavity or sinkhole can form without notice, larger sinkholes are known to encompass cars, homes, even buildings. Despite the compacting method employed, in many instances cavities can be filled to eliminate the need for compaction, or provide for better compaction results. Cement grouting is a commonly used method to fill sinkholes and cavities, and very popular in Florida. However, cement grouting is difficult to excavate in the future and the groundwater flow can be disturbed as the cement inhibits water flow. In the case of sand filling by an excavator, it is difficult to know how much volume of a cavity is filled as the density of the sand is inconsistent.

PRIOR ART

Applicant specializes in fluidized sand technology for use as the filling material and compaction methods of loose sandy ground to mitigate liquefaction having the following patents awarded in Japan:

JP04052970B2 disclosing: Pumping method for fine-granule material, involves supplying fine air bubble from bottom part of slurry, containing fine-granule material, viscosifying material and water to obtain a slurry containing fine air bubble.

JP004346078B2 disclosing: Foundation improvement work method used in vacuum suction of water contained by weak ground involves penetrating vacuum pipe from ground surface side through sand matte layer.

JP4823968B2 disclosing: Sand-post creation construction method, involves creating sand-post by foundation-improvement material, adding plasticization agent simultaneously with press-fit, and press-fitting or compacting plasticized sand-post material in earth. The patent claims making the sand pile in the ground using the fluid sand made from sand, fluidizer and plasticizer JP5188894B2 disclosing: Sand pile formation method for ground improvement, involves press-fitting fluidization materials in ground in fluid state and plasticizing fluidization materials inside ground to obtain sand pile structure. The patent claims a method to make the sand pile using the fluid sand including delayed plasticizer. The fluid sand keeps its fluidity during construction but after a certain time it lost its fluidity through the influence of the plasticizer JP5188901B2 disclosing: Granular lump i.e. sand-post, creating method for construction application, involves maintaining fluidization items containing granular material, biodegradable polymer and water in fluid state, and plasticizing items in ground.

JP5189951B2 disclosing: Fluidization sand production plant for sand post development system has biaxial paddle type mixer which mixes fluidization sand with sand post material, water, plasticizer and delayed effective plasticization agent.

JP5389615B2 disclosing: Compaction sand compaction pile creation apparatus for reinforcing ground, has sand compaction pile material fluidization object and plasticizing agent mixing hopper equipped with hollow tube for sand compaction pile creation. The patent claims a ground improvement method for making sand piles in the ground. Sand piles are made by injecting the fluid sand into the ground through the casing pipe. However, this fluid sand is plasticized in the hopper equipped at the top of the casing pipe.

JP5320248B2 discloses a method that presses the fluid sand including the delayed plasticizer into the ground through the casing pipe penetrated down to the preset depth to make a sand pile with a certain length. The casing pipe is lifted up by a certain height automatically according to a detection of a volume of injected fluid sand.

JP5545622B2 disclosing: Foundation improvement method for use in construction of sand compaction pile, involves penetrating front-end of hollow tube towards underground bottom portion and side portion outside face, to inject ground improvement material. The patent claims a ground improvement method for making stabilized soil in the ground, using a casing pipe to inject stabilizers. This casing pipe is able to be positioned vertically or horizontally or aslant, and to be driven into and pulled from the ground keeping its position. This improvement method machine is able to control the volume of stabilizer according to the location or the depth continuously.

JP5404344B2 disclosing: Slag pile construction method involves press-fitting fluidization material containing slag, and plasticizer with respect to ground surface. The patent claims a method for making slag piles in the ground through injecting fluid material including slug (the ratio of particles that diameter is under 0.075 mm is less than 15%), water, fluidizer, and plasticizer. After injection, this fluid material is plasticized in the ground.

JP5360908B2 disclosing: Method for improving sea bottom ground in coast such as harbor, involves carrying out drive control of raising/lowering mechanism according to variation of detected tide level in sea area of construction vicinity.

JP5780714B2 disclosing: Filling method for underground cavity of structure e.g. building foundation, involves filling underground cavity with fluidization material whose main component is sand, such that fluidization material does not solidify after filling. The patent discloses a method for filling up cavities which are made by settling or flowing out of soil in the ground with a fluid material which is mainly made from sand. This fluid material will be not solidified after being filled up.

JP5478386B2 disclosing: Method for reinforcing e.g. underground cavity of foundation structure of building, involves forming sand compaction pile by plasticizing sand compaction pile material in fluid state which is injected into of underground cavity. The patent claims a ground improvement method which has following two processes: making sand piles below the cavities in the ground; and filling up cavities with a fluid material which is mainly made from sand and will be not solidified after filling.

JP5697248B2 disclosing: Method for reducing displacement of object structure e.g. quay-wall, involves constructing structure in specific location according to water level change by ebb and flow such that influence of excess water pressure is not received.

JP6150328B2 disclosing: Foundation improvement method involves compacting ground without giving displacement to existing structure used as object while repeating operation which pressingly injects fluid through pumping by pump unit towards ground surface side.

JP6188081B2 disclosing: Fluidization sand for ground improvement, has addition amount of highly water absorbing resin that is increased or decreased so as to adjust fluidization maintenance time which is maintaining fluidization state.

JP6335020B2 disclosing: Transmissive columnar underground purification body which is installed in horizontal state or inclined state in an unsaturated layer between contaminated soil area and underground water.

SUMMARY OF THE INVENTION

The fluidized sand of the instant invention is used as a filling material for sinkholes, holes after withdrawal of piles, and the like ground void spaces referred to herein as cavities. The fluidized sand composition of the instant invention is easily injected into a ground cavity wherein the material allows for compaction, permits water flow through the material, and can be easily excavated. The fluidized sand composition is produced by mixing graded sand, an anionic polymer fluidizer, a cationic polymer plasticizer, and a surface active agent. The fluidized sand unit weight can be changed by the amount of plasticizer included and the mixing/vibration duration.

An objective of the invention is to provide a ground filler that provides soil stabilization and will not disturb the ground water flow. A benefit of the fluidized sand composition is that the local sand can be used.

Still another objective of the invention is to provide a substitute for cement grout which is known to disturb groundwater flow and is difficult to excavate.

Another objective of the invention is to provide a fluidized sand composition for use in compaction to mitigate liquefaction.

Another objective of the invention is to provide a ground filler with controllable unit weight up to 20 kN/m3.

Still another objective of the invention is to provide a ground filler with constant fluidity for various unit weight (Table flow=170 mm for various unit weight).

Yet still another objective of the invention is to provide a ground filler with controllable fluidity duration on one hour to several months.

A benefit of the fluidized sand composition is that volume of the cavity being filled can be determined as the density of the fluidized sand composition is uniform.

Still another benefit of the fluidized sand composition is the ease of future excavation.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Florida and parts of Texas, Alabama, Missouri, Kentucky, Tennessee, Pennsylvania, and New Zealand have areas of sand and limestone which cause problems for soil compaction. Of great concern is the limestone pinnacles that form and need to be dispersed for proper foundation. Lack of proper compaction subjects an area to sinkhole formation, or sinkhole formation has occurred. In either event the soil needs to be stabilized to fill the sinkhole or the cavity addressed that can result in a sinkhole.

The fluidized sand of the instant invention is used as a filling material for cavities, sinkholes and the like open void ground spaces. In a preferred embodiment, each 1 m³ of fluidized sand receives a dosage comprising: Fluidizer consisting of a polyacrylamide and sodium polyacrylate anionic polymer of about 9.1 kg/m³ (=15.3 lb/yd³); Plasticizer consisting of polyethylene, polyamine, dimethylamine, and epichlorohydrin cationic polymer of about 0.7 kg/m³ (=1.2 lb/yd³); and a surface active agent of about 0.7 kg/m³ (=1.2 lb/yd³).

Nonionic surfactant surface agent may be selected from the group consisting of, for example, diethanolamide; Polyoxyethylene alkyl ether; or polyoxypropylene blockpolymer.

The fluidized sand can be injected after withdrawing piles in the natural ground by controlling the ingredients of the fluidized sand. After filling, the fluidized sand will return to the solid natural condition according to the effect of plasticizer previously added.

The fluidized sand is injected into a ground cavity wherein the material allows for compaction, permits water flow through the material, and can be easily excavated. The fluidized sand is produced by mixing graded sand, a anionic polymer fluidizer, a cationic polymer plasticizer, and a surface active agent. The fluidized sand unit weight can be changed by the amount of plasticizer included and the mixing/vibration duration.

Figure 1:
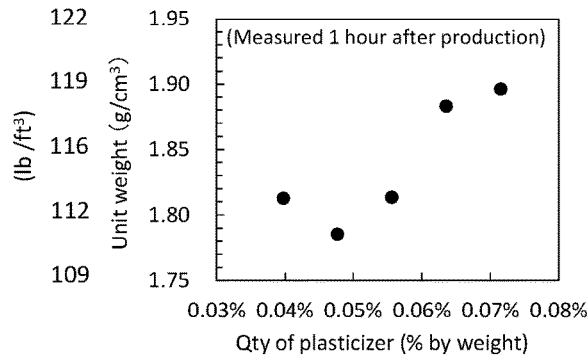
FIG. 1 is a chart of controllable unit weight through dosage.

Referring to FIG. 1, set forth is chart depicting one method of controlling unit weight wherein the unit weight can be changed through dosage of a plasticizer providing a controllable weight. The unit weight indicated in lb/ft³ is changed through the quantity of plasticizer added indicated in lb/yd³. The unit weight by this method is controlled trough dosage. For example, if 1.4 lb/yd³ of plasticizer is added the unit weight will be about 114 lb/ft³. If 1.9 lb/yd³ of plasticizer is added, the unit weight will be about 119 lb/ft³.

Polyacrylamide is defined as:

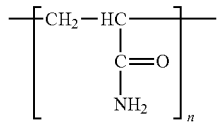

and sodium polyacrylate defined as:

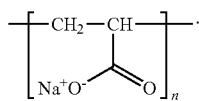

Figure 2:
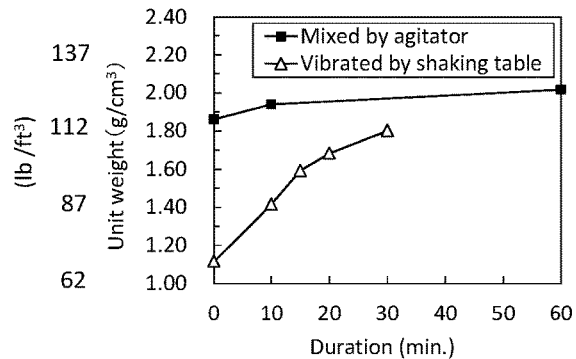
FIG. 2 is a chart of controllable unit weight through mixing—vibration.

Referring to FIG. 2, set forth is chart depicting another method of controlling unit weight, wherein the unit weight can be changed through mixing/vibration of the fluidized sand for a duration of time indicated in minutes. The unite weight in this example is controlled through mixing/vibration. For example, if an agitator is operated for 10 minutes the unit weight will be about 123 lb/ft³. If a shaking table is operated for about 20 minutes the unit weight will be 110 lb/ft³.

Polyethylene is defined as:

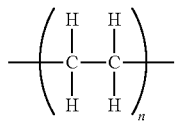

Polyamine is defined as:

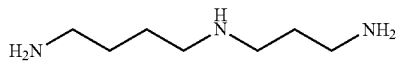

Dimethylamine is defined as:

and Epichlorohydrin is defined as:

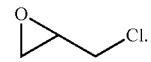

Figure 3:
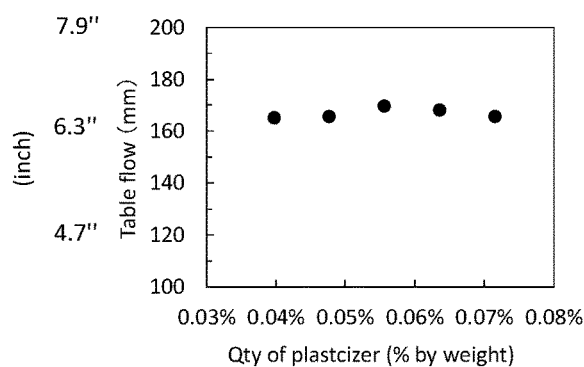
FIG. 3 is a chart of constant fluidity using table flow by quantity of plasticizer.
Figure 4:
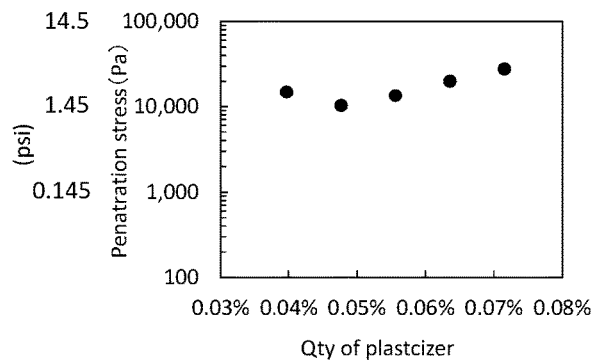
FIG. 4 is a chart of constant fluidity using penetration stress by quantity of plasticizer.

Referring to FIG. 3 a mortar flow table is provided illustrating a table flow (mm) and the quantity of plasticizer added indicated in lb/yd³ to obtain a constant fluidity. FIG. 4 compares penetration stress (Pa) to the quantity of plasticizer added indicated in lb/yd³.

Figure 5:
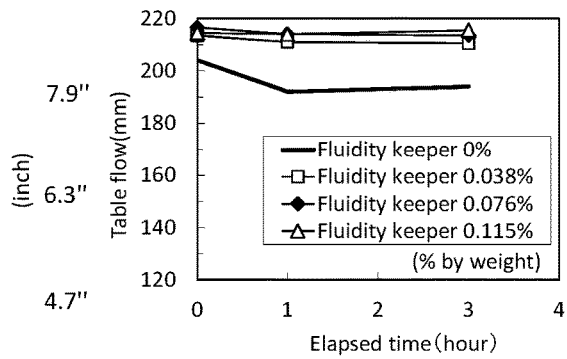
FIG. 5 is a controllable fluidity duration illustrating table flow by duration.
Figure 6:
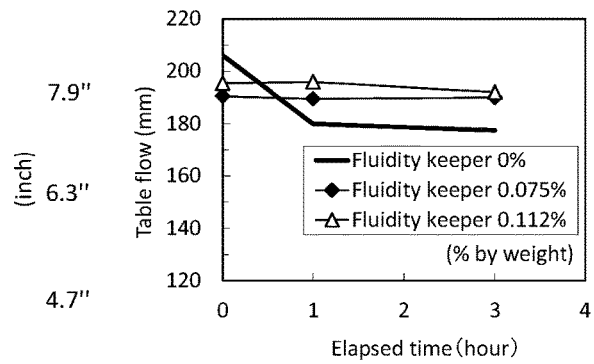
FIG. 6 is a controllable fluidity duration illustrating table flow by duration.

Referring to FIG. 5, illustrated is the controllable fluidity duration by adding a fluidity keeper. 1.0 g of fluidity keeper allows a higher flow rate as compared to 0 g. FIG. 6 depict further illustrates the use of a lower flow rate with 1.0 g of fluidity keeper compared to 0 g of fluidity keeper.

Unique to this invention is the method of making sand into a composition having a suitable fluidity for filling cavities, having a small variation of property over time, having a constancy of volume and/or density during working. The fluidized composition comprising: adding a quantity of water to sand forming fluidized sand; admixing anionic polymers and cationic polymers to said fluidized sand forming a fluidized composition; measuring the density of the fluidized composition; injecting the fluidized composition into a cavity; sampling the injected fluidized composition by use of a Standard Penetration test; measuring the density of the sampled composition; wherein said injected fluidized composition having a constancy of volume and constancy of density compared to the fluidized composition before injection to provide soil stability and water migration.

The test work procedure comprising 1) Measuring the density of the fluid sand in the plant; 2) Injecting the fluid sand into the polyvinyl chloride pipe or the hole excavated by an auger using a squeeze pump; 3) Sampling the injected fluid sand by Standard Penetration Test; and 4) Measuring the density of the sampled sand of 3).

By way of example, results in the case of the polyvinyl chloride pipe: 1) Sand A(Komono-sand) γ=1.920 g/cm³ in the plant, 1.914 g/cm³ just after injection; γ=1.880 g/cm³ in the plant, 1.897 g/cm³ just after injection.

Results, in the case of 2) Sand B(Namekata-sand) γ=1.890 g/cm³ in the plant, 1.838 g/cm³ just after injection; γ=1.830 g/cm³ in the plant, 1.854 g/cm³ just after injection.

In the case of the polyvinyl chloride pipe: 1) Sand B(Namekata-sand) γ=1.890 g/cm³ in the plant, 1.879 g/cm³ just after injection.

The fluidized sand composition produced by mixing the graded sand, fluidizer and plasticizer, are used to fill ground cavities and natural sinkholes. Cavities such as those generated after extracting the piles in the natural ground by controlling the amount of plasticizer. Once the fluidized sand composition is placed into the cavity, the fluidized sand composition will return to the solid natural condition according to the effect of the plasticizer added previously. Testing has demonstrated that the density of the fluidized sand can be controlled to be consistent even if injection more than 10 m.

The term "about" means, in general, the stated value plus or minus 10%. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fluidized composition for soil stability and water migration in a cavity comprising:
    adding a quantity of water to sand forming fluidized sand;
    admixing about 9.1 kg/m³ anionic polymer for each 1 m³ of fluidized sand;
    admixing about 0.7 kg/m³ cationic polymer plasticizer for each 1 m³ of fluidized sand;
    admixing about 0.7 kg/m³ of a surface active agent for each 1 m³ forming a fluidized composition;
    measuring the density of said fluidized composition;
    injecting said fluidized composition into a cavity;
    sampling said injected fluidized composition by use of a Standard Penetration test;
    measuring the density of said sampling;
    wherein said injected fluidized composition having a constancy of volume and constancy of density to provide soil stability and water migration.

2. The fluidized composition according to claim 1 wherein said anionic polymer consists of polyacrylamide and sodium polyacrylate.

3. The fluidized composition according to claim 1 wherein said cationic polymer plasticizer consists of polyethylene, polyamine, dimethylamine, and epichlorohydrin.

4. The fluidized composition according to claim 1 wherein the sand is graded and obtained from an area local to the cavity.

5. The fluidized composition according to claim 1 including the step of adding a fluidity keeper, wherein the fluidity keeper extends the fluidity duration of the fluidized sand.

6. The fluidized composition according to claim 2 wherein said polyacrylamide is defined as:

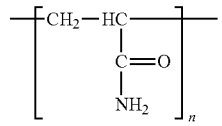

and said sodium polyacrylate defined as:

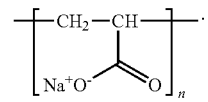

7. The fluidized composition according to claim 3 wherein said polyethylene is defined as:

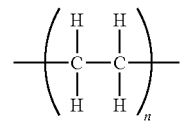

polyamine is defined as:

Dimethylamine is defined as:

and Epichlorohydrin is defined as:

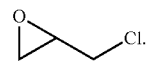

8. The fluidized composition according to claim 1 wherein the unit weight of said fluidized sand can be altered by the amount of plasticizer added and the duration of mixing/vibration.

9. The fluidized composition according to claim 1 wherein said surface agent is non-ionic.

10. The fluidized composition according to claim 9 wherein said surface agent is selected from the group consisting of: diethanolamide; polyoxyethylene alkyl ether; or polyoxypropylene blockpolymer.

* * * * *